US010877738B2

(12) United States Patent
Storm et al.

(10) Patent No.: US 10,877,738 B2
(45) Date of Patent: *Dec. 29, 2020

(54) ONE CLICK APPLICATION ASSET DISTRIBUTION

(71) Applicant: Advanced New Technologies Co., Ltd., George Town (KY)

(72) Inventors: Gregory Lee Storm, Parkville, MO (US); Riddhiman Das, Kansas City, MO (US); Zikomo Fields, Lake Lotawana, MO (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,284

(22) Filed: Feb. 3, 2020

(65) Prior Publication Data

US 2020/0174768 A1    Jun. 4, 2020

Related U.S. Application Data

(63) Continuation of application No. 16/024,106, filed on Jun. 29, 2018, now Pat. No. 10,552,136.

(51) Int. Cl.
*G06F 8/61*     (2018.01)
*G06F 21/60*   (2013.01)
(Continued)

(52) U.S. Cl.
CPC ............. *G06F 8/61* (2013.01); *G06F 21/602* (2013.01); *G06F 21/6218* (2013.01); *H04L 63/0876* (2013.01); *H04L 67/34* (2013.01)

(58) Field of Classification Search
CPC ...... G06F 8/61; G06F 21/602; G06F 21/6218; H04L 63/0876; H04L 67/34
See application file for complete search history.

(56) References Cited

U.S. PATENT DOCUMENTS 6,496,979 B1    12/2002   Chen et al.
6,578,199 B1 *   6/2003   Tsou .................. G06F 8/61
                                                           717/174
(Continued)

FOREIGN PATENT DOCUMENTS

CN    104216905    12/2014
CN    107015824    8/2017
(Continued)

OTHER PUBLICATIONS

Cheng et al., "A service oriented framework for construction supply chain integration", 2009, Elsevier B.V. (Year: 2009).*
(Continued)

*Primary Examiner* — Wei Y Zhen
*Assistant Examiner* — Junchun Wu
(74) *Attorney, Agent, or Firm* — Fish & Richardson P.C.

(57) ABSTRACT

The technology described in this document can be embodied in a method that includes receiving at a second device a request for data sharing from a first device, and receiving a first file package associated with an application installed on the first device, and the file package includes a first portion of information usable for installation of the application on the second device. The method also includes processing the first file package to obtain the first portion of information usable for installing the application on the second device, providing authentication information for downloading a second file package to a remote computer device different from the first device, and installing the application on the second device using the first portion of information and the second portion of information.

17 Claims, 8 Drawing Sheets

(51) Int. Cl.
  *H04L 29/08* (2006.01)
  *H04L 29/06* (2006.01)
  *G06F 21/62* (2013.01)

(56) References Cited

U.S. PATENT DOCUMENTS

| | | | |
|---|---|---|---|
| 7,587,713 B1* | 9/2009 | Barrett | G06F 9/451 717/168 |
| 7,926,053 B1 | 4/2011 | Rowe et al. | |
| 8,365,164 B1* | 1/2013 | Morgenstern | G06F 8/61 717/175 |
| 8,924,957 B1 | 12/2014 | Newstadt et al. | |
| 2001/0029607 A1* | 10/2001 | Veres | H04N 5/262 717/170 |
| 2002/0002702 A1* | 1/2002 | Shiobara | G07F 19/206 717/170 |
| 2005/0223376 A1* | 10/2005 | Morris | G06F 8/61 717/177 |
| 2007/0169109 A1* | 7/2007 | Neswal | G06F 8/61 717/174 |
| 2008/0127167 A1 | 5/2008 | Elliott | |
| 2008/0155533 A1* | 6/2008 | Mittapalli | G06F 8/61 717/176 |
| 2008/0256532 A1 | 10/2008 | Xie et al. | |
| 2008/0301672 A1* | 12/2008 | Rao | G06F 8/61 717/177 |
| 2010/0205284 A1 | 8/2010 | Newton et al. | |
| 2010/0262962 A1* | 10/2010 | Chaganti | G06F 8/61 717/174 |
| 2011/0283276 A1 | 11/2011 | Andrews et al. | |
| 2012/0159470 A1 | 6/2012 | Yang | |
| 2012/0159472 A1 | 6/2012 | Hong et al. | |
| 2012/0284704 A1 | 11/2012 | Friedman et al. | |
| 2013/0047143 A1* | 2/2013 | Chalmers | G06F 21/572 717/168 |
| 2013/0125111 A1 | 5/2013 | Michielsens et al. | |
| 2014/0059642 A1* | 2/2014 | Deasy | G06F 21/53 726/1 |
| 2014/0082610 A1* | 3/2014 | Wang | H04W 4/12 717/178 |
| 2014/0096025 A1 | 4/2014 | Mandel et al. | |
| 2014/0181801 A1 | 6/2014 | Voronkov et al. | |
| 2014/0259001 A1* | 9/2014 | Brunsman | G06F 8/61 717/171 |
| 2015/0007167 A1 | 1/2015 | Mody et al. | |
| 2015/0278374 A1 | 10/2015 | Van De Poel et al. | |
| 2015/0324181 A1 | 11/2015 | Segal | |
| 2016/0072682 A1 | 3/2016 | Wagener et al. | |
| 2016/0103668 A1 | 4/2016 | Srinivasan et al. | |
| 2016/0188312 A1* | 6/2016 | Shi | H04L 67/10 717/176 |
| 2016/0196134 A1* | 7/2016 | Holtmanns | G06F 8/654 717/172 |
| 2016/0378455 A1 | 12/2016 | Lochan et al. | |
| 2019/0238592 A1* | 8/2019 | Qureshi | H04W 12/0027 |

FOREIGN PATENT DOCUMENTS

| | | | | |
|---|---|---|---|---|
| CN | 104871172 B | * | 12/2017 | H04L 67/10 |
| CN | 104683409 B | * | 3/2019 | H04W 4/60 |

OTHER PUBLICATIONS

Sundareswaran et al., "Ensuring Distributed Accountability for Data Sharing in the Cloud", Aug. 2012, IEEE, vol. 9, No. 4, (Year: 2012).*
Guimaraes, "Managing Application Program Maintenance Expenditures", Oct. 1983, ACM, vol. 26, No. 10 (Year: 1983).*
Catuogno et al., "Secure Dependency Enforcement in Package Management Systems", Mar. 2017, IEEE, vol. 17, No. 2 (Year: 2017).*
Graupner et al., "Resource-Sharing and Service Deployment in Virtual Data Centers," Proceedings of the 22nd International Conference on Distributed Computing Systems Workshops, IEEE, 2002, 6 pages.
Kenteris et al., "An innovative mobile electronic tourist guide application," Pers Ubiquit Comput, 2009, 13:103-118.
Myllymaki et al., "Location Aggregation from Multiple Sources," Proceedings of the Third International Conference on Mobile Data Management, IEEE, 2002, 8 pages.
Reinhardt [offline], "We bought a successful app, loaded it with extras and watched it fail," Recode, Oct. 2016, [retrieved on Mar. 27, 2019], retrieved from: URL<https://www.recode.net/2016/10/4/13151432/app-size-calculator-bloat-experiment-developers-segment>, 10 pages.
Zhou et al., "Detecting Repackaged Smartphone Applications in Third-Party Android Marketplaces," North Carolina State University, ACM, 2012, pp. 317-326.

* cited by examiner

ONE CLICK APPLICATION ASSET DISTRIBUTION

CROSS-REFERENCE TO RELATED APPLICATIONS

This application is a continuation of U.S. application Ser. No. 16/024,106, filed on Jun. 29, 2018, which is hereby incorporated by reference in its entirety.

TECHNICAL FIELD

This disclosure generally relates to sharing data such as that pertaining to installation of applications between multiple mobile devices.

BACKGROUND

Mobile operating systems such as the iOS® developed by Apple Inc. or the Android® operating system developed by Google Inc., allow users to download and install applications developed by third-party developers. Such mobile applications (referred to as "apps") are hosted on application repositories or databases often referred to as "app stores."

SUMMARY

In one aspect, this document features a computer-implemented method that includes receiving, at a second device, a request for data sharing from a first device via a local communication link between the first device and the second device. The method also includes receiving, over the local communication link, a first file package associated with an application installed on the first device, wherein the file package includes a first portion of information usable for installation of the application on the second device. The method also includes processing, by one or more processors of the second device, the first file package to obtain the first portion of information usable for installing the application on the second device, and providing, to a remote computer device different from the first device, authentication information for downloading a second file package. The second file package is supplementary to the first package for installing the application on the second device. The method also includes receiving from the remote computing device, responsive to providing the authentication information, the second file package, wherein a size of the second file package is smaller than a file package that is independently usable for installing the application on the second device. The method also includes processing, by the one or more processors of the second device, the second file package to obtain a second portion of information usable for installing the application on the second device, and installing the application on the second device using the first portion of information and the second portion of information.

In another aspect, this document features one or more non-transitory, computer-readable storage devices storing instructions executable by one or more processing devices to perform various operations. The one or more processing devices are configured to receive, at a second device, a request for data sharing from a first device via a local communication link between the first device and the second device. The one or more processing devices are also configured to receive, over the local communication link, a first file package associated with an application installed on the first device, wherein the file package includes a first portion of information usable for installation of the application on the second device. The one or more processing devices are also configured to process, by one or more processors of the second device, the first file package to obtain the first portion of information usable for installing the application on the second device. The one or more processing devices are also configured to provide, to a remote computer device different from the first device, authentication information for downloading a second file package, the second file package being supplementary to the first package for installing the application on the second device. The one or more processing devices are also configured to receive from the remote computing device responsive to providing the authentication information, the second file package, wherein a size of the second file package is smaller than a file package that is independently usable for installing the application on the second device. The one or more processing devices are also configured to process, by the one or more processors of the second device, the second file package to obtain a second portion of information usable for installing the application on the second device, and installing the application on the second device using the first portion of information and the second portion of information.

In another aspect, this document features a mobile device that includes a wireless communication interface, memory, and one or more processing devices. The wireless communication interface is configured to receive a request for data sharing from a first device via a local communication link between the mobile device and a different, first device. The one or more processing devices are interoperably connected to the wireless communication interface and the memory, and configured to receive, from the first device, a first file package associated with an application installed on the first device, wherein the file package includes a first portion of information usable for installation of the application on the mobile device. The one or more processing devices are also configured to process the first file package to obtain the first portion of information usable for installing the application on the mobile device, and provide, to a remote computer device different from the first device, authentication information for downloading a second file package. The second file package is supplementary to the first package for installing the application on the mobile device. The one or more processing devices are also configured to receive from the remote computing device responsive to providing the authentication information, the second file package, wherein a size of the second file package is smaller than a file package that is independently usable for installing the application on the mobile device, and process, the second file package to obtain a second portion of information usable for installing the application on the mobile device. The application can be installed on the mobile device using the first portion of information and the second portion of information.

Implementations of the above aspects can include one or more of the following features. Each of the first device and the second device is one of: a cellular phone, a wireless personal digital assistant (PDA), or a laptop computer. The local communication link can include a personal area network (PAN) link, a near-field communication (NFC) link, or a Wi-Fi link. The request for data sharing can include an option for a user of the second device to accept the request. The authentication information can be extracted from the first file package. Processing the first file package at the second device can include using a decompression process to obtain assets included in the first file package. The first file package can be encrypted, and the second file package can include a decryption key usable for decrypting the first file package.

Various implementations described herein may provide one or more of the following advantages. By allowing for installation of an application via downloading only a fraction of the amount of data associated with a full installation package, the technology described herein enables users to experience benefits of the application while potentially saving significant time and data usage associated with downloading the application. This in turn can improve the overall usability of the application for some users, and potentially promote the popularity of an application by reducing the users' burden associated with downloading and installing the application.

DETAILED DESCRIPTION

Figure 1:
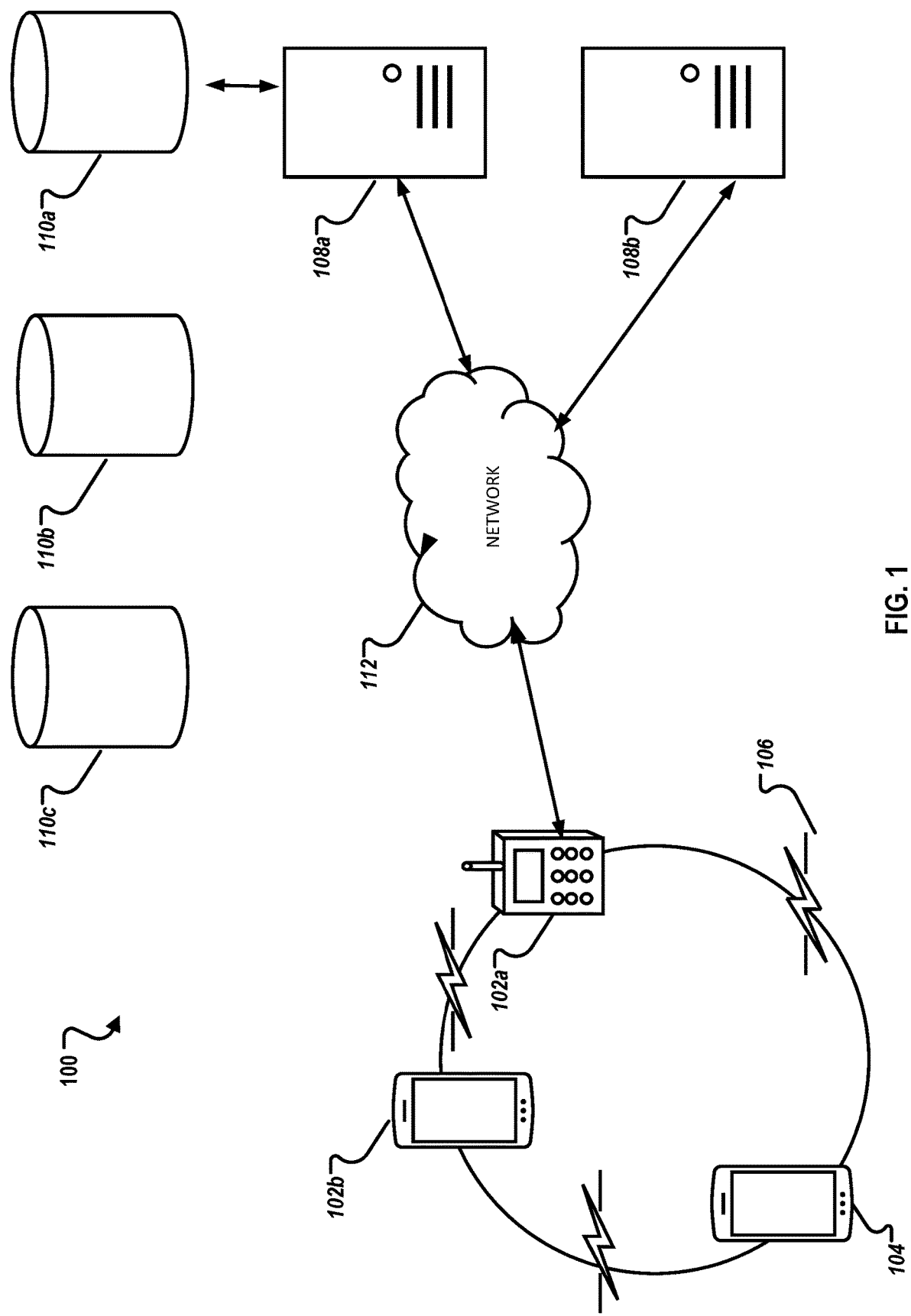
FIG. 1 shows an example environment in which the technology described herein can be deployed.

This document describes technology that allows for a mobile device to locally share at least a portion of assets associated with a mobile application (referred to as an "app") with one or more other mobile devices, such that the one or more other mobile devices may install the application without downloading a full installation package from a corresponding application repository (referred to as an "app store"). Typically, to install a mobile application, a user has to download the full installation package for the application to the user's mobile device. In some places where the telecommunication network is weak and/or the available bandwidth for downloading is low, downloading the full installation package can be time consuming. In addition, if users have to pay for data usage based on the size of downloaded files (e.g., per megabyte of data), users may be less likely or reluctant to install an application, particularly if the size of the corresponding installation package is large. In some cases, this can hinder usability of some applications, in turn, causing some applications to fail based at least in part due to users' reluctance to download and install the applications due to the corresponding sizes of the installation packages. For example, at least one study found that increasing the size of a test application from 3 MB to 99 MB reduced installations by 43%, and an increase to 150 MB reduced installations by 66% percent.[1] Application sizes have increased significantly over the last few years, and developers appear to have little room to optimize the size of an app. For example, in 2012, the average size of a non-gaming iOS app was 23 MB, but by 2016, the number became 73 MB.[2] The size of mobile applications continue to increase as developers include more and more functionalities into the applications.[3]

[1] Reinhardt, P. (2016, Oct. 4). We bought a successful app, loaded it with extras and watched it fail. Retrieved May 7, 2018, from https://www.recode.net/2016/10/4/13151432/app-size-calculator-bloat-experiment-developers-segment
[2] Id.
[3] Id.

The technology described herein allows for the distribution of at least a portion of assets associated with a mobile application via a simple user interface of a mobile device, such that the application may be installed on a receiving device without downloading the full installation package. Here, "assets" refer to electronic files and packages (e.g., encrypted and/or unencrypted files) that may be used to install an application. For example, the assets associated with an application can include one or more of an executable file, a data file, a software package, usable by a device for installing an application. In some cases, the technology described herein may significantly decrease the time and/or cost for downloading an application, thereby improving the user experience associated with downloading and installing the application. For example, a first user who has an application already installed on the mobile device, can share, via a local or personal network, a portion of the assets associated with the application with one or more trusted users (e.g., as included in a user-defined "circle of trust"). Here "circle of trust" can refer to a user's family, friend, or anyone she would trust for sharing digital files. Once a second user in the first user's circle of trust receives the portion of assets associated with the application, she can log in with her credentials to authenticate her profile with a remote repository (e.g., an app store associated with the operating system of the mobile device of the second user). Once the remote computing device determines that the second user is authenticated to install the application, the remote computing device can allow the second user to download a file package configured to install the application based, at least in part, on the portion of assets received from the mobile device of the first user. The size of the downloaded file package can be a fraction (e.g., ⅒ to 1/100) of the size of the full installation package for the application. For example, the second user can use the downloaded file package to unpack the portion of assets received from the mobile device of the first user, and install the application on her device using the unpacked files. Therefore, by allowing for installation of an application via downloading only a fraction of the amount of data associated with a full installation package, the technology described herein enables users to experience benefits of the application while potentially saving significant time and data usage associated with downloading the application. This in turn can improve the overall usability of the application for some users, and potentially promote the popularity of an application by reducing the users' burden associated with downloading and installing the application.

FIG. 1 shows an example environment 100 in which the technology described herein can be deployed. The environment 100 includes at least one mobile device 104 (also referred to herein as the "first device") that is configured to share an application installed on the device 104 with one or more other mobile devices 102*a*, 102*b*, etc. (also referred to herein in general as "second devices 102"). In some implementations, the second devices 102 can be included in a set of trusted devices associated with the circle of trust of the user of the first device 104. For example, a user of the first device 104 can select (e.g., via a user-interface presented on the first device 104) one or more of the user's contacts, and the corresponding mobile devices can be included in the set of trusted devices for the user of the first device 104. In some implementations, the set of trusted second devices 102 can be defined in accordance with a user's affiliation with an entity such as a corporation, university, or other organization. For example, employees of a corporation may be in the circle of trust of one another, allowing sharing of applications between the corresponding mobile devices.

In some implementations, the first device 104 is configured to communicate with the second devices 102 over a local communication network 106. The local communication network 106 can include, for example, a wireless personal area network (PAN), a near-field communication (NFC) network, a Bluetooth® connection, a Bluetooth Low Energy (BLE) connection, an infrared link, a Wi-Fi network, or another communication network that enables transmitting file packages among the first and second devices without accessing an external network such as the Internet.

The environment 100 also includes an external network 112 that allows one or more of the first device 104 and second devices 102 to communicate with one or more remote computing devices 108a, 108b, etc. (also referred to herein as 108). In some implementations, the remote computing device 108 can be a server associated with an application repository 110 for the first device 104 and/or a second device 102. For example, each of the devices 102 and 104 can be configured to access a corresponding remote computing device 108 for the purpose of downloading and installing applications. In some implementations, the application repository 110 associated with a remote computing device 108 can be specific to the operating system (iOS®, Android®, etc.) of the corresponding devices 102, 104. In some implementations, the application repository 110 can be associated with the make of a device. In some implementations, the application repository 110 can be associated with a third-party provider of mobile applications that may be downloaded and installed on the devices 102, 104. The external network 112 can include, for example, a local area network (LAN), a wide area network (WAN) including the Internet, one or more access points (APs), and/or one or more other devices that allow the devices 102 and/or 104 to communicate with the remote computing devices 108. In some implementations, the network 112 includes a cellular network. The remote computing device 108 is also connected to one or more application repository 110a, 110b, 110c, etc. The application repository 110 (e.g., an app store) stores various applications. It can be, for example, a Blackberry store, a Samsung store, an LG store. The applications are available for downloading to the first device 104 and the second device 102 via the remote computing device 108 over one or more networks. In some implementations, each of application repositories 110 can be specific to an operating system. For example, the application repository 110a can store applications that run on Google's Android mobile operating system, while the application repository 110b can store applications that run one Apple's iOS mobile operating system. In some implementations, the application repository 110 can also store cross-platform applications that can run on both Google's Android mobile operating system and Apple's iOS mobile operating system (e.g., generic content applications). Thereby, the application repository 110 can be common to the first device 104 and the second device 102. Alternatively, the first device and the second device can connect with different application repositories 110.

Each of the first device 104 and the second device 102 is a wireless enabled device configured to communicate with other wireless-enabled devices. For example, the first device 104 and/or the second device 102 can be a smartphone, a tablet, a laptop, an e-reader, or another device configured to download, install, and execute mobile applications (apps). In some implementations, the second device 102 can be a legacy mobile device (referred to as a candy-bar phone) with limited Internet access capability. In some cases, a second device 102 may have Internet access capability, but can be in an area where the connectivity to the Internet is weak, making downloading a full installation package for an app time consuming. In some cases, a data subscription plan associated with the second device 102 can make downloading large installation packages expensive, and consequently less feasible for some users.

In some cases, where downloading the full installation package for an application on the second device 102 is time consuming or otherwise problematic, the first device 104 (which has the application installed) can be configured to send a portion of the assets associated with installing the application (referred to herein as "first file package") to the second device, such that the application can be installed on the second device 102 without the second device 102 having to directly download the full installation package from a corresponding remote computing device 108. For example, the first file package, which is sent from the first device 104 to the second device 102 via the local communication network 106, can be configured to include a significant portion of the electronic files needed for installing the application on the second device 102. The second device can then simply authenticate itself with a remote computing device 108, and download a supplementary file package (referred to herein as the "second file package) that is used in conjunction with the first file package to install the application on the second device 102. The second file package can be significantly smaller (e.g., in terms of number of bytes) than the first file package, thereby significantly reducing the amount of data the second device 102 downloads directly over the external network 112 to install the application.

The first file package can be generated in various ways. In some implementations, the first file package is generated at the first device 104 from the assets available at the first device. For example, the first device 104 can be configured to generate a compressed file package from the full installation package available to the first device 104. In some implementations, the first file package may be provided to the first device 104 when the application is installed on the first device 104. For example, the first file package can be provided to the first device 104 as a portion of the full installation package associated with the application.

Upon receipt of the first file package, the second device 102 can initiate a process to authenticate itself with a corresponding repository to receive the second file package. In some implementations, the second device 102 provides authentication information to the remote computing device 108 associated with the corresponding application repository, and the remote computing device in turn communicates with an authentication database (shown in FIG. 1, not shown in FIG. 2) to authenticate the second device 102. In some implementations, the remote computing device 108 can be configured to authenticate the identity of a mobile device when the mobile device attempts to download an application from the application repository 110. In some implementation, the identity information used to authenticate a mobile device's access credential can be stored in an authentication database (not shown in FIG. 1, shown in FIG. 2). The identity information can be stored, for example, in the form of an access code, a verified user-id/password pair, etc. In some implementations, the remote computing device 108 can include an authentication engine (not shown in FIG. 1, shown in FIG. 2) that is configured to authenticate attempts from the second device 102 to download the application. In some implementations, the authentication engine can be configured to authenticate such attempts without communicating with an external device such as a remote authentication server.

After the second device 102 downloads the second file package from the remote computing device 108, the first file package received from the first device 104 and the downloaded second file package can be used in conjunction to install the application on the second device 102. In some implementations, the second file package includes assets (e.g., one or more files) other than those already included in the first file package. In some implementations, the assets of the second file package and the first file package can be used to generate an application installation package for installing the application on the second device 102. Different methods can be used for generating the application installation package. For example, the first file package can include compressed installation configuration files, and the second file package can be configured to function as an "unpacker" that unpacks or decompresses the first file package to generate the application installation package. In another example, the second file package can include one or more additional files (e.g., an executable file) that are configured to use files from the first file package to install the application on the second device 102.

Figure 2:
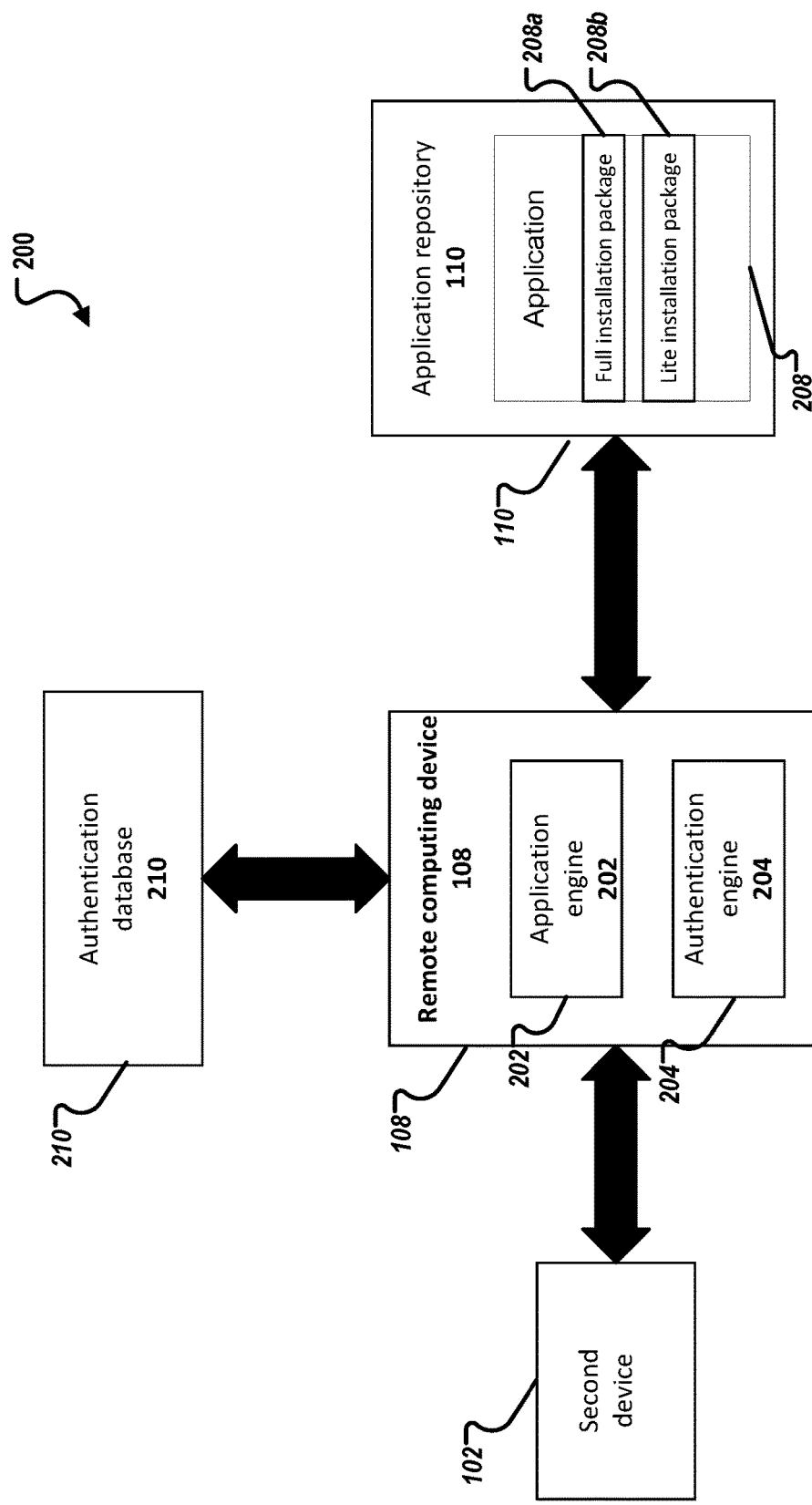
FIG. 2 is a block diagram of an example implementation of a communication system, in which a mobile device can download applications in accordance with technology described herein.

FIG. 2 is a block diagram of an example implementation of a communication system 200, in which a mobile device (e.g., a second device 102) can download applications in accordance with technology described herein. The system 200 includes a second device 102, a remote computing device 108, an application repository 110, and an authentication database 210. The remote computing device 108 can also include an application engine 202.

The application repository 110 can include a database storage device accessible to the remote computing device 108. The application repository 110 can be configured to store downloadable installation packages corresponding to various applications. In some implementations, the application repository 110 can store two versions of installation packages for an application 208—a first version 208a that includes the full installation package for the application, and a second version 208b (which may be referred to a "skinny" or "lite" version) that includes the second file package described above. The full installation package 208a can include all the files required for installing the application, and the lite installation package 208b can include only a portion of the files (e.g., the second file package, as described above) required for installing the application. The lite installation package 208b is only a fraction (e.g., 1/100 to 1/10) of the size of the full installation package 208a.

In some implementations, the remote computing device 108 may communicate with an authentication database 210. The authentication database 210 can include a library that stores identification information and/or authentication information for various mobile devices and/or the corresponding users. In some implementations, the identification information can include a content-specific identifier (e.g., an access code) associated with a first file package that is sent from a first device 104 to the second device 102. In some implementations, the identification information can include a user/device-specific identifier (e.g., information associated with a specific user or a specific device).

In some implementations, the remote computing device 108 can include an application engine 202. The application engine 202 can receive, from the second device 102, a request for downloading an application 208 stored in the application repository 110. One or more processors on the application engine 202 can be configured to process the request and determine, for example, which application, or which version of the corresponding installation package to send to the second device 102. In some implementation, before sending the installation package to the second device 102, the remote computing device 108 communicates with an authentication database 210 to authenticate the identity of the second device 102. In some implementations, the authentication may also be done using an authentication engine (not shown) residing on the remote computing device 108. The process of downloading the application from the application repository 110 to the second device 102 through the remote computing device 108, including the process of authenticating the identity of the second device 102 with the authentication database 210, is discussed below with reference to FIG. 1.

Figure 3:
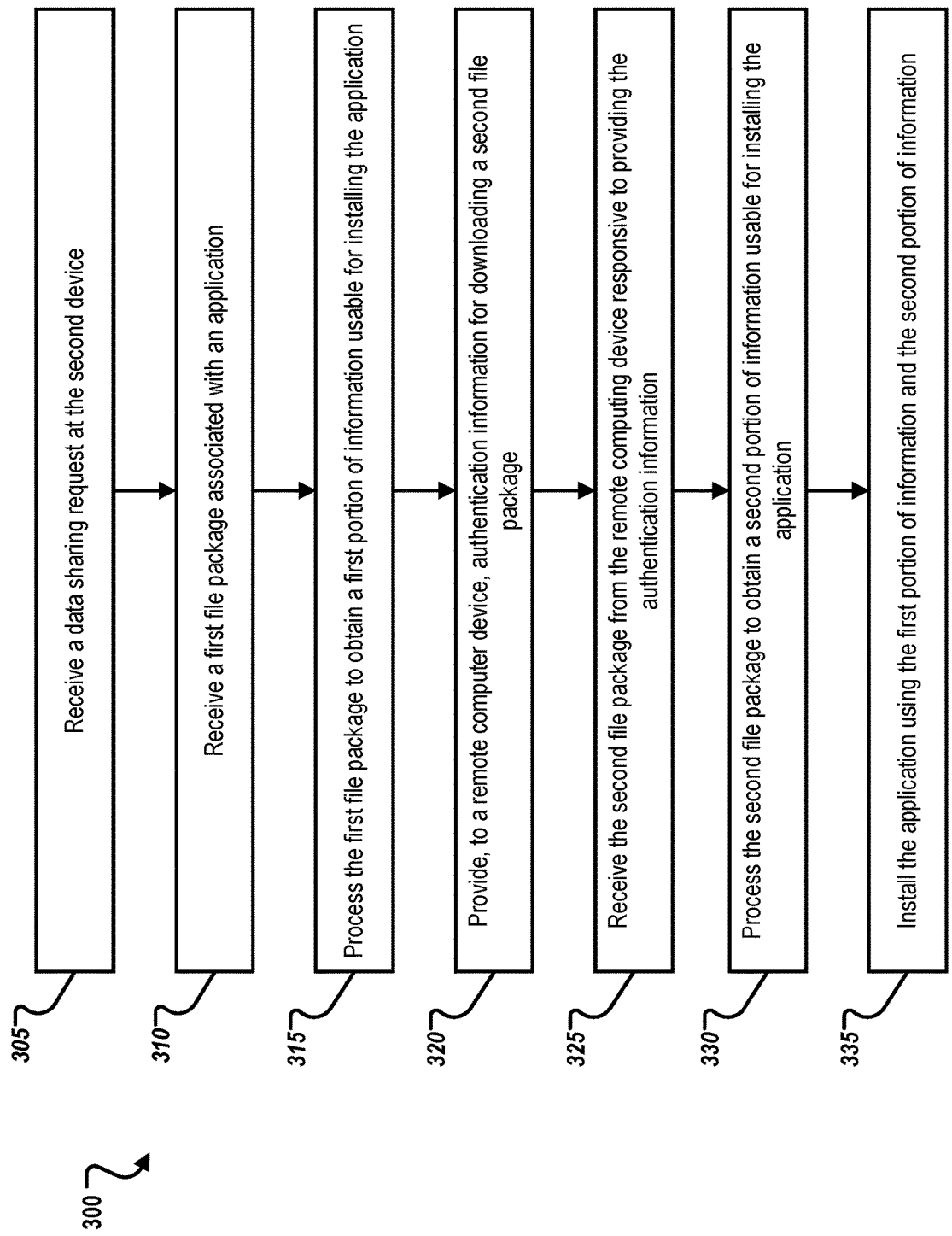
FIG. 3 is a flowchart illustrating a method for installing an application on a mobile device based on file packages received from different sources.

FIG. 3 is a flowchart illustrating a process 300 for installing an application on a device based on file packages received from different sources. Specifically, the process 300 illustrates how an application is installed on a second device by using a first file package received from a first device, in conjunction with a second file package downloaded from a remote computing device. In some implementations, at least a portion of the process 300 can be executed by one or more processing devices of a mobile device such as a second device 102 described above.

At block 305, a request for data sharing is received from the first device at the second device. In some implementations, the request is transmitted via a wireless personal area network (PAN) link or a near-field communication (NFC) link. In some implementations, the request for data sharing is received responsive to sending another request to the first device. In some implementations, the request received from the first device includes an option for the second device to accept the request. In some implementations, a response is communicated to the first device responsive to receiving a user-input (via a user-interface of the second device) accepting or declining the option to accept the data sharing request.

At block 310, a first file package associated with an application installed on the first device is received at the second device from the first device. The first file package can be substantially similar to the first file package described above with reference to FIG. 1, and can include a portion of information usable for installation of the application on the second device. The first file package can be received from the first device over a local communication network such as a personal area network (PAN) link, a near-field communication (NFC) link, a Wi-Fi link, etc. In some implementations, the first file package can be in a compressed format.

At block 315, the first file package is processed at the second device, to obtain a first portion of information usable for installing the application on the second device. In some implementations, the first file package is decoded by using a decompression process to obtain the files and/or other assets included in the first file package.

At block 320, authentication information for downloading a second file package is provided to a remote computing device and from the second device. In some implementations, the second file package is supplementary to the first package for installing the application on the second device. In some implementations, the remote computing device is associated with an application store or repository hosting installation packages associated with various applications. For example, the remote computing device can be substantially similar to the remote computing device 108 described above with reference to FIGS. 1 and 2, and the repository can be substantially similar to the application repository 110 described above with reference to FIG. 2.

At block 325, a second file package is received from the remote computing device responsive to the authentication information. The size of the second file package is smaller than a file package that is independently usable for installing the application on the second device. For example, the second file package can be substantially similar to the lite installation package 208*b* described above with reference to FIG. 2, a size for which is smaller (e.g., in terms of number of bytes) than the full installation package 208*a*.

At block 330, the second file package is processed at the second device to obtain a second portion of information usable for installing the application. At block 335, the application is installed at the second device by using the first portion of information and the second portion of information. In some implementations, for example, the second portion of information can be used as an "unpacker" to unpack the first portion of information to generate all the information needed to install the application.

Figure 4:
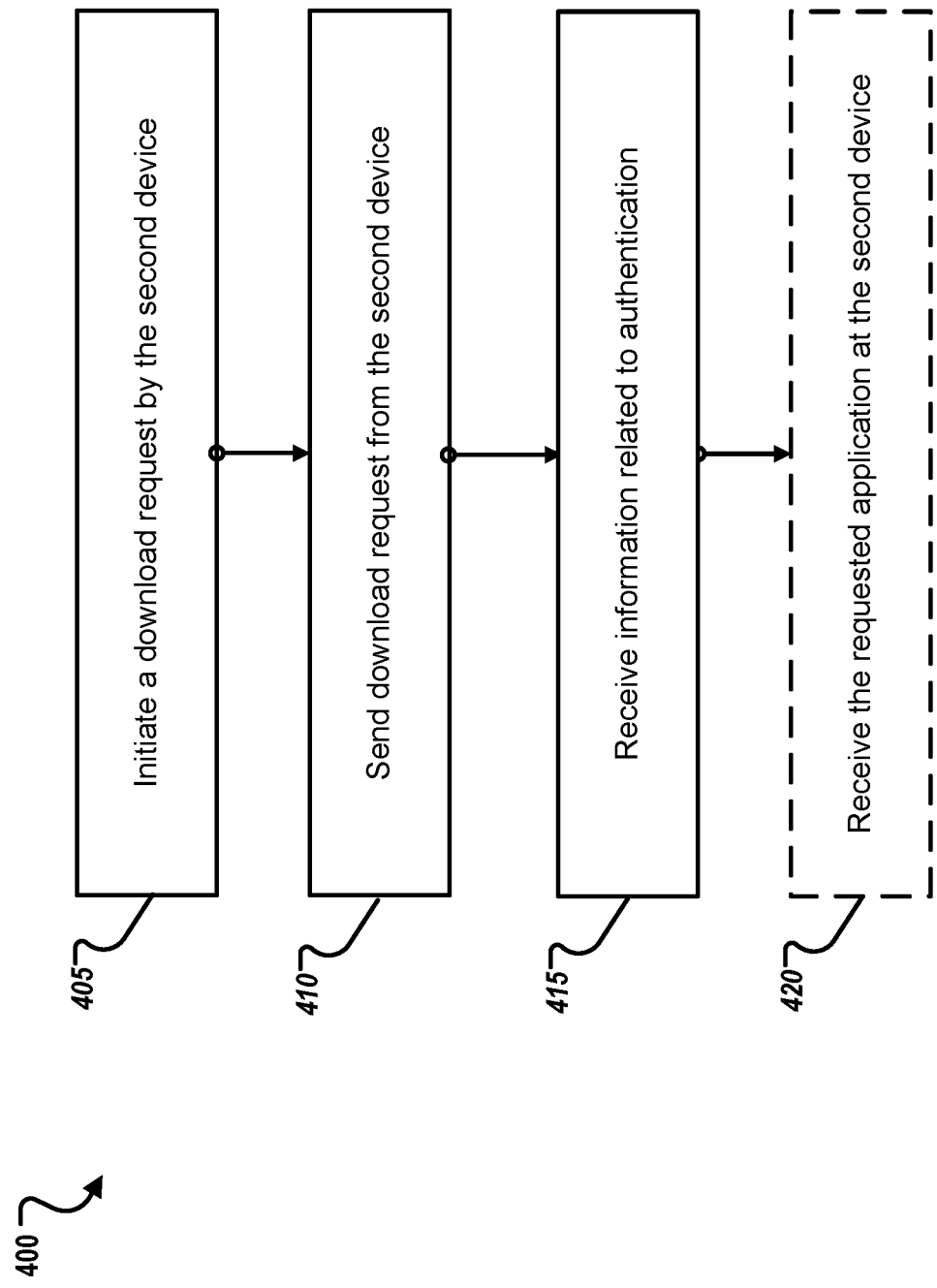
FIG. 4 is a flowchart illustrating a method for downloading an application to a mobile device from a remote computing device.

FIG. 4 is a flowchart illustrating an example process 400 for downloading an application to the second device from a remote computing device. At block 405, the application download process is initiated by the second device. For example, the process 400 can be initiated by the second device 102 by connecting to an app store responsive to receiving a first file package from another mobile device such as the first mobile device 104 described above.

At 410, a download request is sent from the second device 102 to the remote computing device 108. In some implementations, the request can be initiated at the second device 102 via a user-selection of a lite installation package of an application via a user interface of the corresponding app store. In some implementations, the download request may be automatically initiated upon receipt of a file package from another mobile device. In some implementations, the remote computing device 108 can be configured to connect to a separate source (such as an app store or other application repository) to obtain the requested application. The requested application may be provided to the requesting device upon receipt of appropriate credentials. The credentials can be tied, for example, to the device, or a user of the device. For example, the credentials can include a MAC address of the device, a login account-password pair, an access code, a unique identifier, etc. In some implementations, the second device 102 may be authenticated by the remote computing device 108 prior to being provided with a file package for downloading the application.

At 415, the second device receives information related to being authenticated by the remote computing device. In some implementations, this can include receiving request for additional information from the remote computing device 108. In some implementations, this can include receiving information indicative of whether or not the second device has been authenticated by the remote computing device. For example, the second device may receive information indicating that the second device has not been authenticated by the remote computing device 108 to receive the requested application. Examples of authentication processes that may be used are described in FIGS. 5 and 6. If the second device 102 cannot be authenticated, the process 400 can be configured to terminate. If on the other hand, the second device 102 can be authenticated, the second device 102 receives the requested lite installation package from the remote computing device 108 at block 420. Once the second device 102 receives the lite installation package from the remote computing device 108, the application may be installed on the second device 102 as described above with reference to FIG. 2.

Figure 5:
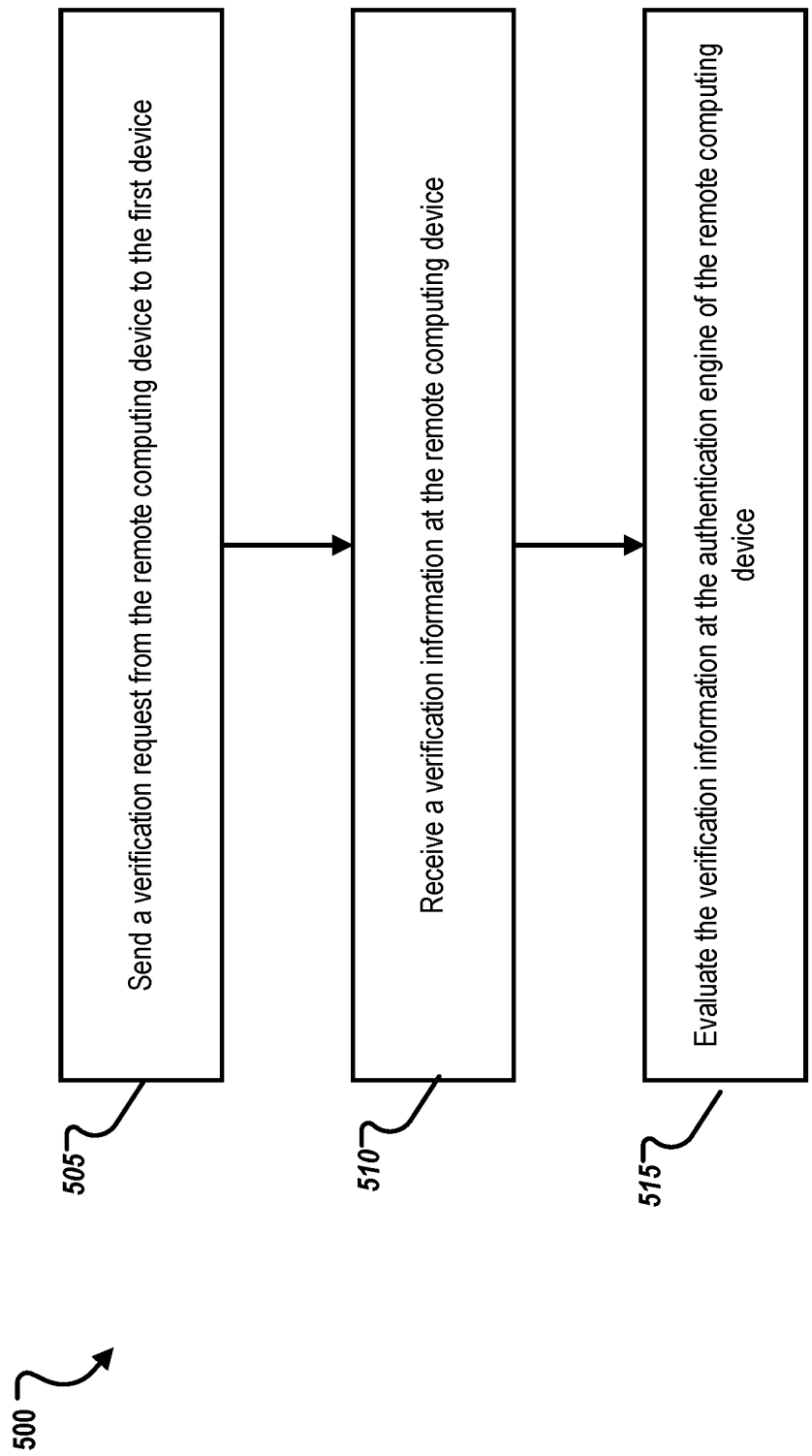
FIG. 5 is a flowchart illustrating a method for authenticating a mobile device.

FIG. 5 is a flowchart illustrating an example process 500 for authenticating the second device. In some implementations, at least a portion of the process 500 is executed by one or more processing devices of the remote computing device 108. In some implementations, the remote computing device 108 can be configured to communicate with the first device 104 in authenticating the second device 102.

At block 505, upon receipt of a download request from the second device 102, a verification request is sent from the remote computing device 108 to the first device 104. In some implementations, the request received at the remote computing device 108 also indicates that the second device 102 has received a first file package from the first device 104. In such cases, the remote computing device 108 can be configured to send, to the first device 104, a request for verifying that the first device 104 has indeed provided the first file package to the second device 102. In some implementations, the verification request sent from the remote computing device 108 can be a text message indicating that a particular device is attempting to download a lite installation package of an application installed on the first device 104, and requesting confirmation whether a user of the first device 104 has authorized such action.

At block 510, the verification information is received at the remote computing device 108 from the first device 104. The verification information can be sent, for example, via a return text message (e.g., including a "Yes" or "No" string or another code conveyed from the first device 104). In some implementations, the verification information can include identification information pertaining to the second device 102, such as, a MAC address of the second device, user information associated with the second device 102, etc.

At block 515, the received verification information is evaluated (e.g., by the authentication engine 204 of the remote computing device 108) to determine whether the access attempt from the second device 102 is legitimate. For example, if the verification information received from the first device 104 confirms that the second device 102 has been authorized to request a lite installation package from the remote computing device 108, the second device can be authenticated. On the other hand, if the verification information received from the first device 104 indicates that the second device 102 has not been authorized to request a lite installation package from the remote computing device 108 (or if no response is received from the first device 104), the second device 102 is not authenticated. In some implementations, the evaluation process also can be performed by the remote computing device 108, for example, by accessing the MAC address or user information as received from the second device 102, and comparing that information with the verification information received from the first device 104. In some implementations, the evaluation result, as determined by the authentication engine 204, is passed to the application engine 202 of the remote computing device 108, for the application engine to send/block transmission of a file package to the second device 102.

Figure 6:
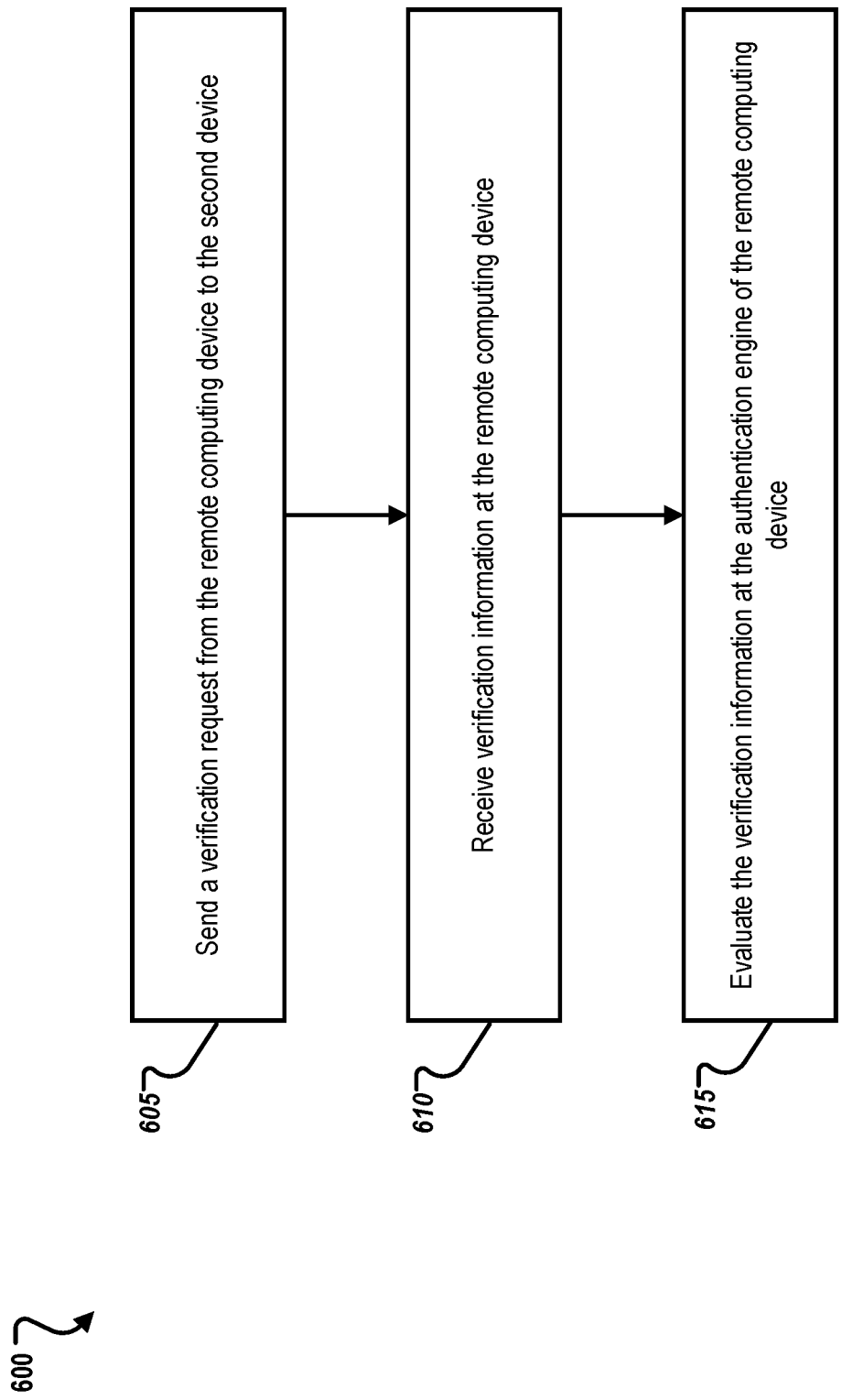
FIG. 6 is a flowchart illustrating another method for authenticating a mobile device.

FIG. 6 is a flowchart illustrating an example of another process 600 for authenticating the second device. In some implementations, at least a portion of the process 600 is executed by one or more processing devices of the remote computing device 108. At block 605, a verification request is sent from the remote computing device 108 to the second device 102. For example, if the second device has not previously authenticated itself with the remote computing device 108, the remote computing device 108 can be configured to send a verification request directly to the second device 102. Such a verification request can be sent responsive to receipt of the download request from the second device 102.

The second device can be authenticated by the remote computing device 108 in various ways. In some implementations, the second device 102 can be authenticated by a unique identifier that is derived from the first file package received at the second device 102. For example, the first file package may include a file having an access code, which is requested by the remote computing device via the verification request. In some implementations, the application vendor may provide a limited number of access codes for an application, for example to limit the number of times a particular application may be shared with other devices.

The verification request can be sent to the second device in various ways. In some implementations, the verification request can be sent in the form of a text message requesting the second device 102 to respond also via a text. In some implementations, the verification request can be presented on a user interface displayed at the second device 102. For example, once the remote computing device 108 receives the download request from the second device 102, the remote computing device 108 can be configured to request the verification information through a user interface of the corresponding app store, as displayed on the second device 102.

At 610, the verification information is received at the remote computing device 108 from the second device 102. In some implementations, the verification information received from the second device can be substantially similar to the verification information described above with reference to FIG. 5. In some implementations, the verification information can include a username-password pair or other authenticating information to authenticate the second device (or a user or user-account associated with the second device) with an app store associated with the remote computing device 108.

At 615, the verification information is evaluated at the authentication engine 204 of the remote computing device 108. In some implementations, the remote computing device 108 can connect to an authentication database 210 to verify the information received from the second device. The authentication database 210 can be configured to store various authentication information. For example, in the case of verification by a unique identifier, the authentication database 210 can be configured to store the access codes included in the first file packages. The remote computing device 108 can evaluate the received verification information by comparing the received verification information with the stored verification information in the authentication database 210. In some implementations, the evaluation results are provided to the application engine 202 of the remote computing device for the application engine to allow/block the transmission of a file package to the second device 102. FIGS. 5 and 6 depict two example authentication processes that may be used in conjunction with the technology described herein. Other authentication techniques such as block chain, smart encryption lock, etc. may also be used without deviating from the scope of this disclosure.

Figure 7:
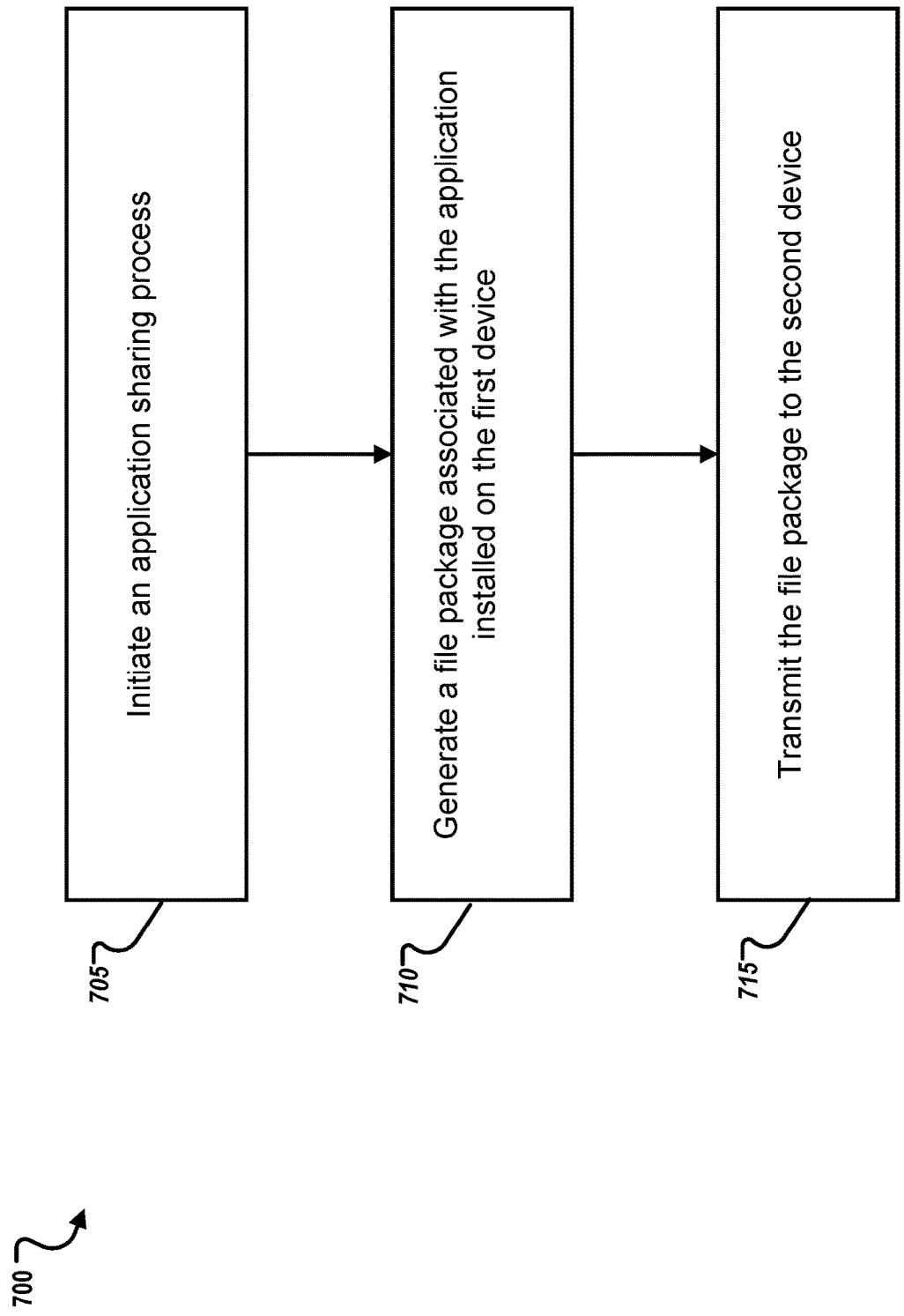
FIG. 7 is a flowchart illustrating a method for generating a first file package by a first device and sending the first file package to a second device.

FIG. 7 is a flowchart illustrating an example of a process 700 for generating and transmitting the first file package by a first device. At least a portion of the process 700 is executed by one or more processing devices of the first device 104. At block 705, the process of sharing an application installed on the first device is initiated at the first device. This can be done, for example, by receiving a user-input indicative of a user's desire to share an application with a device/user within the circle of trust of the first device. In some implementations, the process can be initiated by the first device sending, responsive to user-input, a request to the second device, wherein the request includes an option for a user of the second device to accept the sharing request from the first device.

At block 710, a first file package is generated. The first file package is associated with the application installed on the first device, and can be generated, for example, by processing one or more files or other assets associated with the application, as available at the first device. The first file package includes a portion of information usable for installation of the application on the second device. In some implementations, the first device can select a set of files and/or other assets for generating the first file package, such that only a subset of features of the application is installed on the second device. In some implementations, the first file package can be generated by using compression tools to encode the selected files and/or other assets associated with the application installed on the first device. For example, to reduce the application's size, the first device can be configured to perform one or more of the following: remove unused resources (possibly based at least in part on user-inputs), use scalable drawing objects in place of image files, compress PNG and JPEG files, reduce native and Java code portions, host content in the cloud, etc. In some implementations, the first file package may be available as a portion of the full installation package downloaded on the first device. In such cases, generating the first file package includes identifying the files to be sent as the first file package. In some implementations, generating the first file package can include transmitting a request to a remote computing device (e.g., remote computing device 108 associated with an application repository), and receiving the first file package from such a remote computing device.

At block 715, the generated first file package is sent from the first device to the second device via a local communication network. The local communication network can be a personal area network (PAN) link, a near-field communication (NFC) link, etc. In some implementations, the first file package can be sent responsive to receiving, from the second device, a confirmation that a user of the second device has accepted the request for sharing the application installed on the first device.

Figure 8:
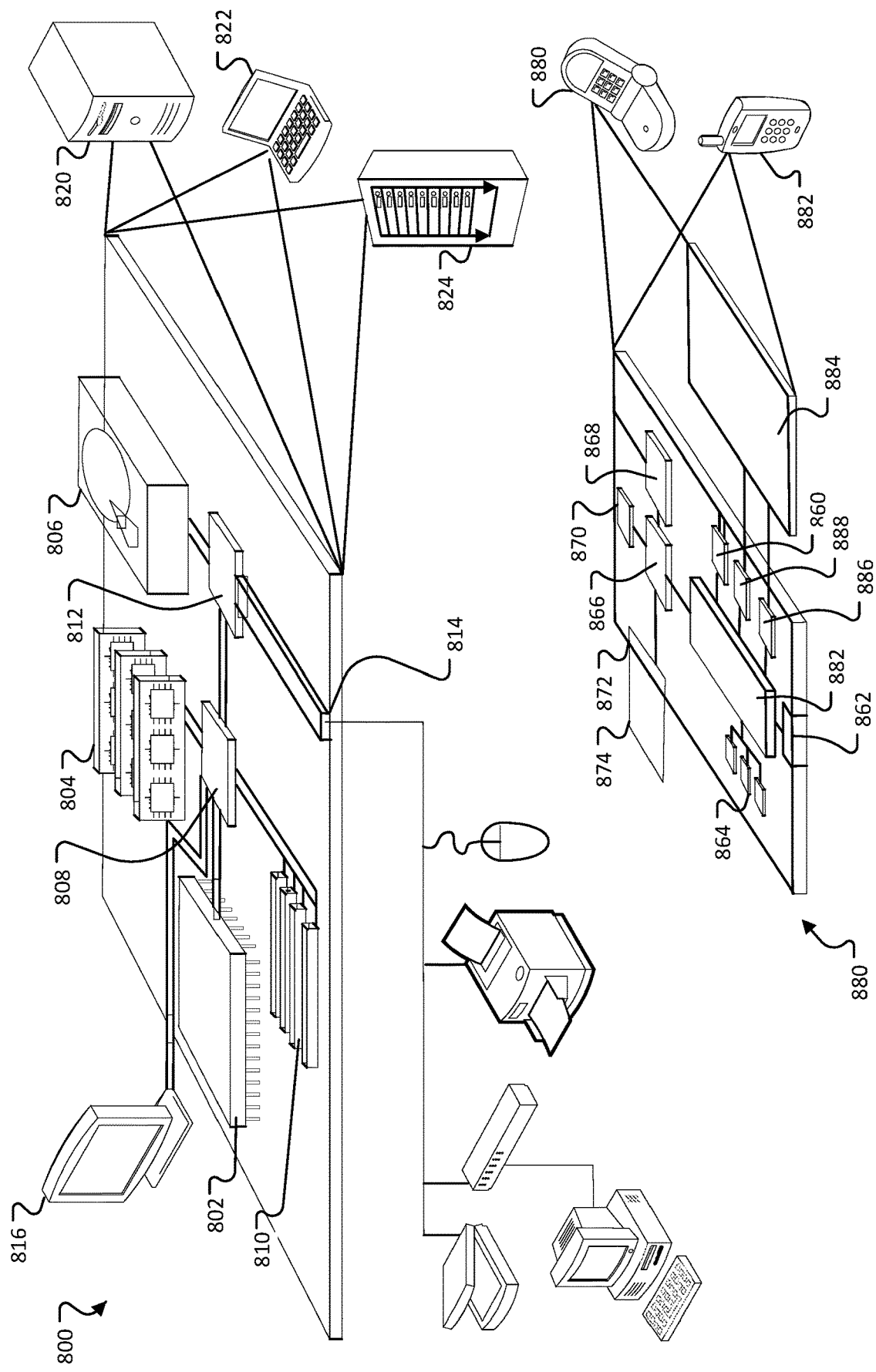
FIG. 8 shows an example of a computing device and a mobile device, which may be used for implementing technology described herein.

FIG. 8 shows an example of a computing device 800 and a mobile device 880, which may be used with the techniques described here. For example, referring to FIGS. 1 and 2, the remote computing device 108, authentication engine 204, application engine 202, or the application repository 110 could be examples of the computing device 800. The first device 104 and the second devices 102 could be examples of the mobile device 880. Computing device 800 is intended to represent various forms of digital computers, such as laptops, desktops, workstations, personal digital assistants, servers, blade servers, mainframes, and other appropriate computers. Computing device 880 is intended to represent various forms of mobile devices, such as personal digital assistants, cellular telephones, smartphones, tablet computers, e-readers, and other similar portable computing devices. The components shown here, their connections and relationships, and their functions, are meant to be examples only, and are not meant to limit implementations of the techniques described and/or claimed in this document.

Computing device 800 includes a processor 802, memory 804, a storage device 806, a high-speed interface 808, connecting to memory 804 and high-speed expansion ports 810, and a low-speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high-speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of a computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory 804 on processor 802, or a propagated signal.

The high-speed interface 808 manages bandwidth-intensive operations for the computing device 800, while the low-speed interface 812 manages lower bandwidth-intensive operations. Such allocation of functions is an example only. In one implementation, the high-speed interface 808 is coupled to memory 804, display 816 (e.g., through a graphics processor or accelerator), and to high-speed expansion ports 810, which may accept various expansion cards (not shown). In the implementation, low-speed interface 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822.

Alternatively, components from computing device 800 may be combined with other components in a mobile device, such as the device 880. Each of such devices may contain one or more of computing device 800, 880, and an entire system may be made up of multiple computing devices 800, 880 communicating with each other.

Computing device 880 includes a processor 882, memory 864, an input/output device such as a display 884, a communication interface 866, and a transceiver 868, among other components. The device 880 may also be provided with a storage device, such as a microdrive or other device, to provide additional storage. Each of the components 880, 882, 864, 884, 866, and 868, are interconnected using various buses, and several of the components may be mounted on a common motherboard or in other manners as appropriate.

The processor 882 can execute instructions within the computing device 880, including instructions stored in the memory 864. The processor may be implemented as a chipset of chips that include separate and multiple analog and digital processors. The processor may provide, for example, for coordination of the other components of the device 880, such as control of user interfaces, applications run by device 880, and wireless communication by device 880.

Processor 882 may communicate with a user through control interface 888 and display interface 886 coupled to a display 884. The display 884 may be, for example, a TFT LCD (Thin-Film-Transistor Liquid Crystal Display) or an OLED (Organic Light Emitting Diode) display, or other appropriate display technology. The display interface 886 can include appropriate circuitry for driving the display 884 to present graphical and other information to a user. The control interface 888 may receive commands from a user and convert them for submission to the processor 882. In addition, an external interface 862 may be provide in communication with processor 882, so as to enable near area communication of device 880 with other devices. External interface 862 may provide, for example, for wired communication in some implementations, or for wireless communication in other implementations, and multiple interfaces may also be used.

The memory 864 stores information within the computing device 880. The memory 864 can be implemented as one or more of a computer-readable medium or media, a volatile memory unit or units, or a non-volatile memory unit or units. Expansion memory 874 may also be provided and connected to device 880 through expansion interface 872, which may include, for example, a SIMM (Single In-line Memory Module) card interface. Such expansion memory 874 may provide extra storage space for device 880, or may also store applications or other information for device 880. Specifically, expansion memory 874 may include instructions to carry out or supplement the processes described above, and may include secure information also. Thus, for example, expansion memory 874 may be provide as a security module for device 880, and may be programmed with instructions that permit secure use of device 880. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 882, or a propagated signal that may be received, for example, over transceiver 868 or external interface 862.

Device 880 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 880, which may be used as appropriate by applications running on device 880.

Device 880 may also communicate audibly using audio codec 860, which may receive spoken information from a user and convert it to usable digital information. Audio codec 860 may likewise generate audible sound for a user, such as through an acoustic transducer or speaker, e.g., in a handset of device 880. Such sound may include sound from voice telephone calls, recorded sound (e.g., voice messages, music files, and so forth) and may also include sound generated by applications operating on device 880.

The computing device 880 may be implemented in a number of different forms, as shown in the figure. For example, it may be implemented as a cellular telephone 880. It may also be implemented as part of a smartphone 882, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can be implemented in combination in a single implementation. Conversely, various features that are described in the context of a single implementation can be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As such, other implementations are within the scope of the following claims.

What is claimed is:

1. A computer-implemented method comprising:
   receiving, at a remote computer device, a download request from a second device, the download request indicating that the second device has received a first file package from a first device over a local communication link between the first device and the second device, wherein the first file package is associated with an application installed on the first device and comprises a first portion of information usable for installation of the application on the second device;

sending, by the remote computer device to the first device, a verification request, wherein the verification request comprises a request to verify that a user of the first device has authorized the download request;

receiving, at the remote computer device from the first device, verification information corresponding to the verification request;

authenticating, by the remote computer device, the received verification information to determine whether the user of the first device has authorized the download request; and in response to determining that the user of the first device has authorized the download request, providing, by the remote computer device to the second device, a second file package, the second file package being supplementary to the first file package and comprising a second portion of information usable for installation of the application on the second device, wherein a size of the second file package is smaller than a size of a file package that is independently usable for installing the application on the second device, and wherein the first file package is encrypted, and the second file package comprises a decryption key usable for decrypting the first file package.

2. The method of claim 1, wherein each of the first device and the second device is a cellular phone, a wireless personal digital assistant (PDA), or a laptop computer.

3. The method of claim 1, wherein the local communication link comprises a personal area network (PAN) link, a near-field communication (NFC) link, or a Wi-Fi link.

4. The method of claim 1, wherein the verification request comprises a text message.

5. The method of claim 1, wherein the verification information comprises identification information pertaining to the second device.

6. The method of claim 1, wherein authenticating the received verification information comprises accessing information received from the second device and comparing the information received from the second device to the received verification information.

7. One or more non-transitory, computer-readable storage devices storing instructions executable by one or more processing devices to perform operations comprising:

receiving, at a remote computer device, a download request from a second device, the download request indicating that the second device has received a first file package from a first device over a local communication link between the first device and the second device, wherein the first file package is associated with an application installed on the first device and comprises a first portion of information usable for installation of the application on the second device;

sending, by the remote computer device to the first device, a verification request, wherein the verification request comprises a request to verify that a user of the first device has authorized the download request;

receiving, at the remote computer device from the first device, verification information corresponding to the verification request;

authenticating, by the remote computer device, the received verification information to determine whether the user of the first device has authorized the download request; and in response to determining that the user of the first device has authorized the download request, providing, by the remote computer device to the second device, a second file package, the second file package being supplementary to the first file package and comprising a second portion of information usable for installation of the application on the second device, wherein a size of the second file package is smaller than a size of a file package that is independently usable for installing the application on the second device, and wherein the first file package is encrypted, and the second file package comprises a decryption key usable for decrypting the first file package.

8. The computer-readable storage devices of claim 7, wherein each of the first device and the second device is a cellular phone, a wireless personal digital assistant (PDA), or a laptop computer.

9. The computer-readable storage devices of claim 7, wherein the local communication link comprises a personal area network (PAN) link, a near-field communication (NFC) link, or a Wi-Fi link.

10. The computer-readable storage devices of claim 7, wherein the verification request comprises a text message.

11. The computer-readable storage devices of claim 7, wherein the verification information comprises identification information pertaining to the second device.

12. The computer-readable storage devices of claim 7, wherein authenticating the received verification information comprises accessing information received from the second device and comparing the information received from the second device to the received verification information.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving, at a remote computer device, a download request from a second device, the download request indicating that the second device has received a first file package from a first device over a local communication link between the first device and the second device, wherein the first file package is associated with an application installed on the first device and comprises a first portion of information usable for installation of the application on the second device;

sending, by the remote computer device to the first device, a verification request, wherein the verification request comprises a request to verify that a user of the first device has authorized the download request;

receiving, at the remote computer device from the first device, verification information corresponding to the verification request;

authenticating, by the remote computer device, the received verification information to determine whether the user of the first device has authorized the download request; and in response to determining that the user of the first device has authorized the download request, providing, by the remote computer device to the second device, a second file package, the second file package being supplementary to the first file package and comprising a second portion of information usable for installation of the application on the second device, wherein a size of the second file package is smaller than a size of a file package that is independently usable for installing the application on the second device, wherein the first file package is encrypted, and the second file package comprises a decryption key usable for decrypting the first file package.

14. The computer-implemented system of claim 13, wherein the local communication link comprises a personal area network (PAN) link, a near-field communication (NFC) link, or a Wi-Fi link.

15. The computer-implemented system of claim 13, wherein the verification request comprises a text message.

16. The computer-implemented system of claim 13, wherein the verification information comprises identification information pertaining to the second device.

17. The computer-implemented system of claim 13, wherein authenticating the received verification information comprises accessing information received from the second device and comparing the information received from the second device to the received verification information.

* * * * *